United States Patent [19]

Raulins et al.

[11] Patent Number: 4,458,925
[45] Date of Patent: Jul. 10, 1984

[54] PIPE JOINT

[75] Inventors: George M. Raulins; George G. Grimmer, both of Farmers Branch, Tex.

[73] Assignee: Otis Engineering Corporation, Dallas, Tex.

[21] Appl. No.: 496,242

[22] Filed: May 19, 1983

[51] Int. Cl.³ .............................................. F16L 25/00
[52] U.S. Cl. .................................. 285/332.2; 285/355; 285/383
[58] Field of Search ................. 285/332.2, 332.3, 333, 285/334, 355, 390, 383

[56] References Cited

U.S. PATENT DOCUMENTS

| 2,907,589 | 10/1959 | Knox | 285/332.2 X |
|---|---|---|---|
| 2,980,451 | 4/1961 | Taylor et al. | |
| 3,100,656 | 8/1963 | MacArthur | |
| 3,467,413 | 9/1969 | Madrelle | 285/332.2 |
| 3,489,437 | 1/1970 | Duret | |
| 3,489,438 | 1/1970 | McClure | 285/334 X |
| 3,497,246 | 2/1970 | Weiner | |
| 3,508,771 | 4/1970 | Duret | 285/334 |
| 3,658,368 | 4/1972 | Hokanson | 285/355 X |
| 4,004,832 | 1/1977 | Connelly | |

FOREIGN PATENT DOCUMENTS

| 635412 | 1/1962 | Canada | 285/333 |
|---|---|---|---|
| 2622944 | 3/1977 | Fed. Rep. of Germany | 285/332.2 |

Primary Examiner—Richard J. Scanlan, Jr.
Attorney, Agent, or Firm—Thomas R. Felger; M. H. Gay

[57] ABSTRACT

A pipe joint with premium threads having both metal-to-metal and polymeric seals to block fluid leakage through the joint. A polymeric seal ring is preferably carried within an annular groove in the box end. Metal sealing surfaces, each having a different inside diameter, are provided on opposite sides of the annular groove to form metal-to-metal seals with two compatible metal sealing surfaces on the exterior of the pin member. The joint is thus characterized by two metal-to-metal seals formed on opposite sides of the annular groove to trap the seal ring therebetween. The metal-to-metal seals cooperate to prevent undesired extrusion of the seal ring.

6 Claims, 4 Drawing Figures

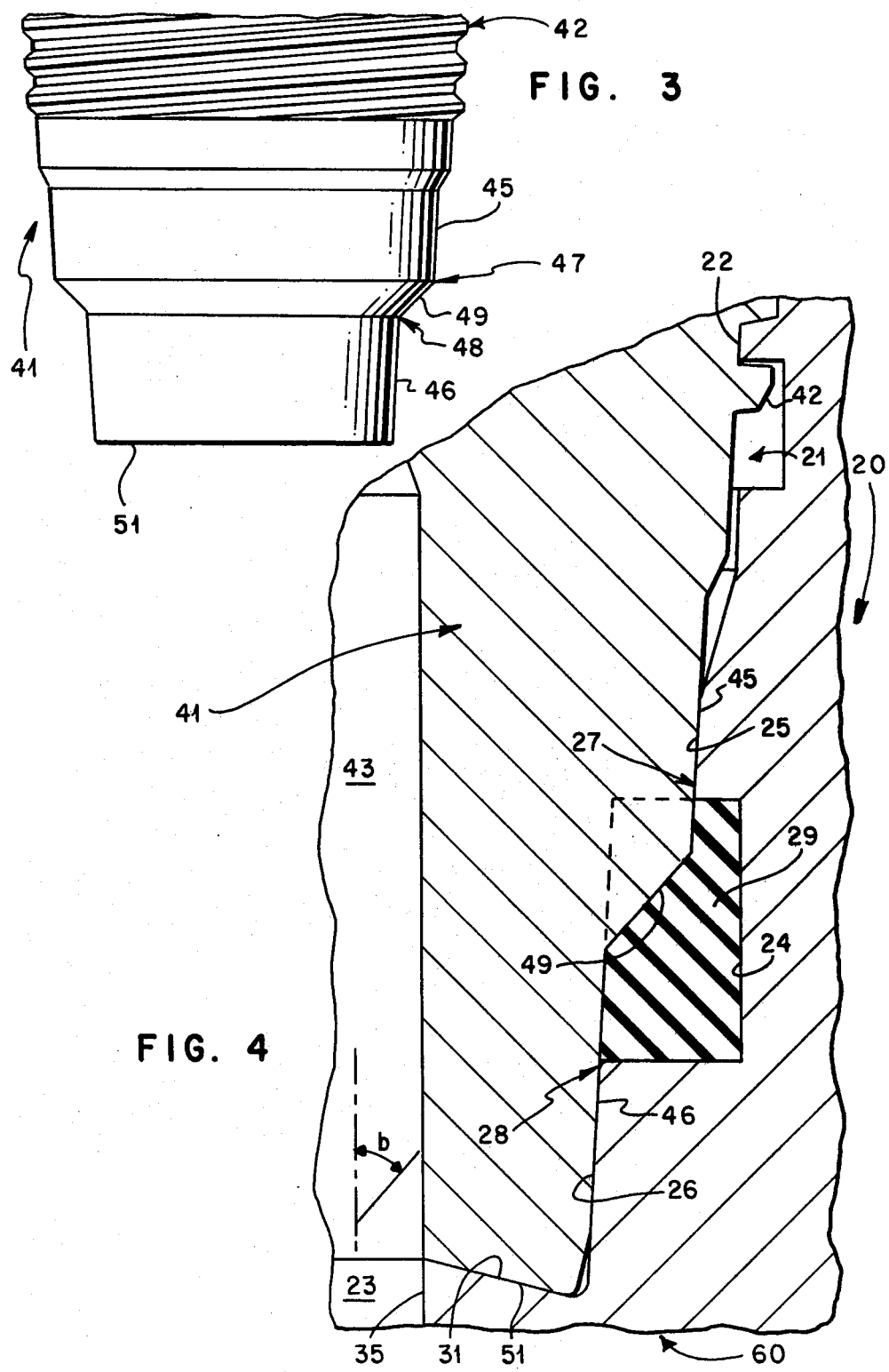

4,458,925

PIPE JOINT

BACKGROUND OF THE INVENTION

1. Field of the Invention

This invention relates to pipe joints with premium threads and more particularly to joints used downhole in a producing well. The invention may be used with drill pipe, tubing or casing, all of which are referred to herein as "pipe".

2. Description of the Prior Art

For many years couplings with threads formed on their inside diameter have been used to attach two relatively long sections of pipe to each other. Examples of such couplings are shown in U.S. Pat. No. 2,980,451 to W. B. Taylor et al; U.S. Pat. No. 4,004,832 to Eugene B. Connelly; and U.S. Pat. No. 3,497,246 to P. D. Weiner. U.S. Pat. No. 2,980,451 also discloses the use of elastomeric or polymeric seal rings to form a fluid barrier between the inside diameter of the coupling and the outside diameter of the portion of pipe disposed therein. U.S. Pat. No. 2,980,451 is incorporated by reference for all purposes herein.

An alternative to the use of couplings has been to upset (enlarge the wall thickness by mechanical means) the end portions of sections of pipe. Appropriate male and female threads are machined on the upset ends to provide a pin means and box means respectively for joining sections of pipe with each other. Examples of such pipe joints and associated premium threads are shown in U.S. Pat. Nos. 3,489,437 to J. L. A. Duret and 3,100,656 to M. D. MacArthur. The premium thread and sealing system of the present invention can be satisfactorily used with either couplings or upset type pipe joints.

COPENDING U.S. PATENT APPLICATIONS

Applicants have the following patent applications pending for inventions related to pipe joints, couplings, and premium threads.

| Ser. No. | Title | Date Filed |
|---|---|---|
| 324,234 | Coupling | November 23, 1981 |
| 367,952 | Pipe Joint | April 13, 1982 |
| 456,526 | Pipe Joint | January 7, 1983 |
| 457,698 | Pipe Joint | January 13, 1983 |

SUMMARY OF THE INVENTION

The trend towards deeper and deeper wells, along with higher pressures and more severe environments found at these depths, has created a requirement for pipe joints with improved fluid seals. Metal-to-metal seals are particularly desirable for high pressure sour gas wells. When exposed to low pressure gas, metal-to-metal seals have a tendency to leak. Therefore, pipe joints with polymeric seal rings are desirable for this condition. Unfortunately, high pressure fluid has a tendency to excessively extrude polymeric seal rings from conventional pipe joints. During the operating cycle of many wells, pipe joints are exposed to both high and low pressures.

The present invention includes a pipe joint with premium threads and a unique sealing system to block fluid leakage between the interior and exterior of the joint. The sealing system comprises a polymeric seal ring in an annular groove with annular metal-to-metal seals disposed on opposite sides thereof. By trapping the seal ring between the metal-to-metal seals, the pipe joint displays the desired fluid seal characteristics of both metal-to-metal seals and a polymeric seal ring similar to a conventional gasket and flange sealing system.

One object of the present invention is to provide a pipe joint with a sealing system effective at both high and lower pressures and temperatures.

Another object of the present invention is to provide a pipe joint with metal-to-metal seals on opposite sides of an annular polymeric seal ring whereby the metal-to-metal seals prevent undesired extrusion of the seal ring.

Still another object of the present invention is to provide a pipe joint which can effectively seal against high differential fluid pressures from either the interior or exterior of the pipe joint.

Additional objects and advantages of the present invention will be readily apparent to those skilled in the art after reading the specification and claims in conjunction with the drawings.

BRIEF DESCRIPTION OF THE DRAWINGS

FIG. 3 is a drawing in elevation of the male or pin means of a section of pipe incorporating the present invention.

FIG. 4 is an enlarged view in section with portions broken away showing the multiple fluid seals formed by engagement between the pin means and box means of a pipe joint incorporating the present invention.

DESCRIPTION OF THE PREFERRED EMBODIMENT

Figures 1, 2:
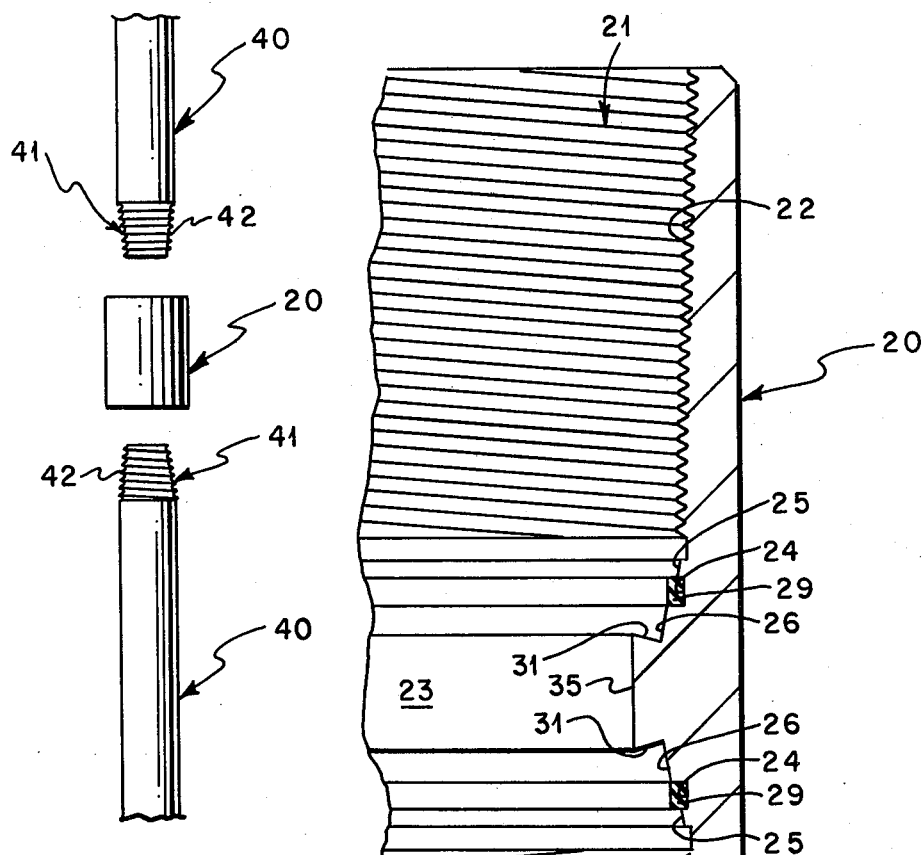
FIG. 1 is a drawing in elevation with portions broken away showing the ends of two sections of pipe and a coupling which can be threadedly engaged with each section to form a pipe joint.
FIG. 2 is an enlarged quarter-sectional view of a coupling incorporating the present invention.

The components of a typical pipe joint, coupling 20 and portions of two pipe sections 40, are shown in FIG. 1. Each pipe section 40 has an identical pin means 41 with external threads 42 near its extreme end. Matching pin means 41 are also provided on both ends of each pipe section 40 (not shown). Each pipe section 40 is a long, hollow tubular member with longitudinal bore 43 extending therethrough.

Coupling 20 is a relatively short, hollow cylinder with longitudinal bore 23 extending therethrough. Identical box means 21 with internal threads 22 are provided in each end of coupling 20. The internal configuration of coupling 20 is symmetrical with respect to internal flange 35. Internal threads 22 and external threads 42 are selected to be coengageable with each other to make up pipe joint 60, a portion of which is shown in FIG. 4. Couplings 20 are used to join a plurality of pipe sections 40 with each other to form a long tubing string which can extend from a wellhead (not shown) to a downhole hydrocarbon producing formation (not shown). Each coupling 20 maintains alignment of adjacent longitudinal bores 43 with each other and its own longitudinal bore 23. This alignment of longitudinal bores 43 and 23 provides a fluid communication flow path between the well surface and selected downhole locations. The present invention provides multiple seals within each pipe joint 60 to prevent fluid communication between the interior and the exterior thereof.

Internal, annular groove 24 is machined in each box means 21 spaced longitudinally from the inner end of internal threads 22. A first annular sealing surface 25 is located between the inner end of internal threads 22 and internal groove 24. Second annular sealing surface 26 is located on the opposite side of internal groove 24. Both first sealing surface 25 and second sealing surface 26 taper inwardly towards the center of box means 21. The taper of sealing surfaces 25 and 26 is selected to form an acute angle of approximately three degrees with the centerline of longitudinal bore 23. The smallest inside diameter 27 of first sealing surface 25 is significantly larger than the largest inside diameter 28 of second sealing surface 26. Annular groove 24 is partially defined by inside diameters 27 and 28 as best shown in FIG. 4.

Each pin means 41 has a first sealing surface 45 on its exterior spaced longitudinally from the end of external threads 42. A second sealing surface 46 is also provided on the extreme end of each pin means 42 spaced longitudinally from its associated first sealing surface 45. Sealing surfaces 45 and 46 of pin means 41 have matching tapers which form metal-to-metal seals with sealing surfaces 25 and 26 respectively of box means 21 during make-up of the pipe joint. Fluid tight engagement of sealing surface 45 with sealing surface 25 and sealing surface 46 with sealing surface 26 is best shown in FIG. 4.

Polymeric seal ring 29 is preferably disposed in each annular groove 24 of box means 21. Shoulder 49 is provided on the exterior of pin means 41 between first sealing surface 45 and second sealing surface 46. Shoulder 49 is partially defined by the smallest outside diameter 47 of first sealing surface 45 and the largest outside diameter 48 of second sealing surface 46. Within the limits of acceptable machining tolerances, inside diameter 27 of box means 21 equals outside diameter 47 of pin means 41, and inside diameter 28 equals outside diameter 48. Shoulder 49 is sized to engage seal ring 29 and form a fluid barrier therewith during make-up of the pipe joint. Preferably, shoulder 49 is beveled relative to sealing surfaces 45 and 46. The amount of bevel is approximately thirty degrees as defined by acute angle b measured between the centerline of longitudinal bore 43 and the extension of shoulder 49.

The fluid barrier formed by shoulder 49 and seal ring 29 will resist fluid communication therepast until the fluid pressure exceeds the pressure or force induced into seal ring 29 during make-up of the pipe joint. The induced pressure in seal ring 29 is a function of its volume, the volume of annular groove 24 and angle b of shoulder 49. The present invention allows each of these factors to be preselected to contain anticipated operating fluid pressures. A wide variety of materials may be used for the manufacture of seal ring 29 such as deformable plastics having characteristics similar to tetrafluoroethylene or elastomers having characteristics similar to polybutadiene/acrylonitrile.

Preferably, matching torque shoulders 31 and 51 are provided within box means 31 and on the extreme end of pin means 41 respectively. Torque shoulders 31 and 51 define the limit of engagement of internal threads 22 with external threads 42. As shown in FIG. 4, torque shoulder 31 of box means 21 forms an acute angle with the interior of box means 21 adjacent thereto. Internal torque shoulder 31 is preferred because its inclined surface urges sealing surfaces 45 and 46 of pin means 41 into firmer contact with sealing surfaces 25 and 26 of box means 21.

ENGAGING SEQUENCE

Pin means 41 is inserted into box means 21 until threads 42 and 22 contact each other. Pin means 42 is then rotated to cause coengagement of threads 42 with threads 22. This threading motion causes pin means 41 to move longitudinally further into box means 21. The length and spacing of first sealing surface 45 and second sealing surface 46 are selected to engage adjacent sealing surfaces 25 and 26 of box means 21 before shoulder 49 contacts seal ring 29. Contact between first sealing surfaces 45 and 25 and second sealing surfaces 46 and 26 induces stress or pressure at the area of engagement due to their taper. This induced pressure is selected to be much greater than anticipated fluid pressure either exterior to or within pipe joint 60. Thus, two independent metal-to-metal seals are formed on opposite sides of annular groove 24.

Continued rotation of pin means 41 will cause beveled shoulder 49 to contact seal ring 29. As previously noted, the present invention offers an opportunity to vary the induced pressure or compression placed on seal ring 29. Preferably, the induced pressure will be much greater than anticipated fluid pressures. Also, by first forming metal-to-metal seals on opposite sides of annular groove 24, seal ring 29 is prevented from excessive extrusion in either direction during make-up of pipe joint 60. This combination of metal-to-metal seals and polymeric seals allows pipe joint 60 to display the desirable characteristics of a conventional gasket and flange sealing system while maintaining an inside diameter and outside diameter compatible with downhole requirements.

ALTERNATIVE EMBODIMENTS

Threads 22 and 42 are shown in FIGS. 3 and 4 as the buttress type which are normally tapered at three quarters of an inch per foot. However, various other well-known thread profiles can be satisfactorily used with the present invention. Examples of such alternative thread profiles are shown in U.S. Pat. Nos. 2,980,451, 4,004,832, and 3,489,437.

Box means 21 can be provided within the upset portion of a section of pipe as shown in U.S. Pat. No. 3,100,656 or 3,489,437. This type of pipe joint eliminates the requirement of a separate coupling. The present invention can be satisfactorily used with either type of joint.

First sealing surfaces 25 and 45 and second sealing surfaces 26 and 46 can have contours other than tapers to establish sealing contact with each. For example, radii could be machined on first sealing surface 45 and second sealing surface 46 to engage adjacent sealing surfaces of box means 21. The principal requirement is that metal-to-metal seals be provided on opposite sides of seal ring 29.

The foregoing disclosure and description of the invention are illustrative and explanatory thereof, and various changes in the size, shape and materials, as well as in the details of the illustrated construction, may be made within the scope of the appended claims without departing from the spirit of the invention.

We claim:

1. A pipe joint for connecting sections of pipe with each other, comprising:
   a. a box means having internal threads and a pin means having external threads and the threads being coengageable with each other to make up the joint;
b. an internal, annular groove in the box means spaced longitudinally from the inner end of the internal threads;
c. a first annular sealing surface located between the inner end of the internal threads and the internal groove and a second annular sealing surface located on the opposite side of the internal groove;
d. both the first and second sealing surfaces tapering inwardly towards the center of the box means and the smallest inside diameter of the first sealing surface significantly larger than the largest inside diameter of the second sealing surface;
e. the pin means having a first sealing surface on its exterior spaced longitudinally from the external threads and a second sealing surface on its exterior spaced longitudinally from the first sealing surface;
f. the first and second sealing surfaces of the pin means and the box means respectively having matching tapers which form metal-to-metal seals during make-up of the joint;
g. a polymeric seal ring disposed in the annular groove;
h. a shoulder on the exterior of the pin means between its first and second sealing surface; and
i. the shoulder energizing the seal ring to form a fluid barrier during make-up of the joint.

2. The pipe joint of claim 1 wherein said first and second seal surfaces of the pin means and the box means are in engagement during make-up prior to said shoulder engaging said seal ring.

3. The pipe joint of claim 2 further comprising:
a. matching torque shoulders within the box means and on the extreme end of the pin means; and
b. the torque shoulder of the box means forming an acute angle with the interior of the box means adjacent thereto.

4. The pipe joint of claim 1, 2, or 3 wherein the box means is provided in a coupling having identical box means in each end thereof.

5. The pipe joint of claim 2 wherein the shoulder on the pin means is beveled.

6. The pipe joint of claim 5 wherein the volume of both the seal ring and the annular groove and the angle of the beveled shoulder are preselected to induce, during make-up of the joint, pressure in the seal ring greater than the fluid pressure being sealed against.

* * * * *